No. 876,206. PATENTED JAN. 7, 1908.
J. E. MANFORD.
FARM GATE.
APPLICATION FILED OCT. 21, 1907.
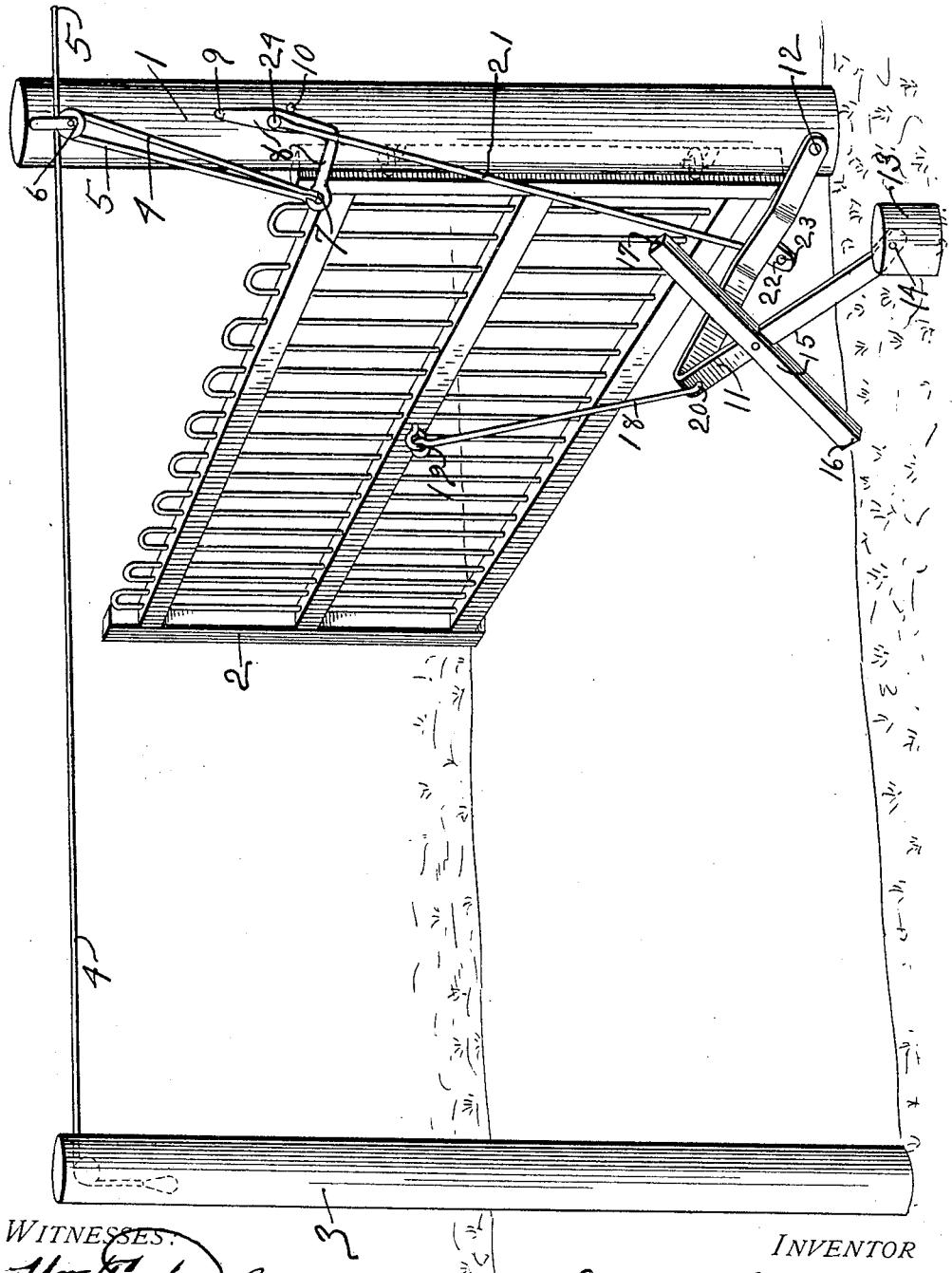
WITNESSES:
INVENTOR
James E. Manford
BY
Attorney

UNITED STATES PATENT OFFICE.

JAMES E. MANFORD, OF FRANKFORT, KENTUCKY.

FARM-GATE.

No. 876,206.  Specification of Letters Patent.  Patented Jan. 7, 1908.

Application filed October 21, 1907. Serial No. 398,431.

*To all whom it may concern:*

Be it known that I, JAMES E. MANFORD, a citizen of the United States, residing at Frankfort, in the county of Franklin, State of Kentucky, have invented certain new and useful Improvements in Farm-Gates, of which the following is a description, reference being had to the accompanying drawings, forming a part hereof.

My invention relates to farm gates of the type adapted to swing across the roadway to be closed, and, more particularly, to swinging gates provided with operating means whereby the gate may be operated by a rider from a distance and without dismounting or alighting.

More specifically stated, my invention relates to swinging gates of the type above defined and in which the operating mechanism includes means for positively locking the gate in its closed position, so that the gate when in its closed position cannot be opened by an animal or by the force of the wind.

The object of my invention is to provide an improved farm gate of the type above specified; and my invention consists in the farm gate illustrated in the accompanying drawing, described in the following specification, and particularly claimed in the clauses of the concluding claim.

The drawing illustrates a perspective view of my improved gate in its closed position.

In the drawing, 1 is an upright post upon which is hinged the gate 2 adapted to swing about said post as an axis to open or close the driveway, as will be understood from the drawing.

3 is an auxiliary post located at a considerable distance from the post 1, and 4 is a flexible operating member, which may conveniently be a rope, and by means of which my improved gate may be operated from the auxiliary post 3. A second auxiliary post, not shown, is located upon the other side of the gate, and a second flexible operating member 5 extends thereto. It will thus be evident that the gate when properly installed may be operated from a distance and from either side thereof. The auxiliary posts may obviously be located at any desired distance from the gate. The flexible operating members 4 and 5 pass through a pulley 6 upon the post 1, and are connected at their lower ends at 7 to a bent lever 8 having its fulcrum at 9 carried by the post 1.

10 is a stop for limiting the movement of the lever 8 to the right. I prefer to form the lever 8 by forging a suitable piece of iron into the required form, and to provide it with an integral extension at 9 extending through the post 1 and forming the fulcrum upon which the lever swings.

For the purpose of swinging the gate 2 about its vertical axis I employ an operating member 11 pivoted at one end to the post 1 as shown at 12, and pivoted at its other end to the support 13 as shown at 14. It will thus be seen that the operating member 11 is adapted to swing upon a horizontal axis passing through the points 12 and 14.

15 is a bar, preferably of wood, secured to the operating member 11 and serving the double purpose of a weight for assisting in swinging the gate and a stop for limiting the extreme positions of the operating member 11. As shown the gate is in its closed position, and the end 16 of the bar 15 is in contact with the ground. When however the operating member is lifted and swung over, so that the end 17 of the bar 15 comes into contact with the ground, the gate will have been swung into its open position.

18 is a pitman connected with the gate 2 at 19, and with the operating member 11 at 20, by joints permitting universal movement, and through which motion imparted to the operating member is transmitted to the gate to swing it into its open or closed position. The operating member 11 is preferably formed from bar iron; and the weight thereof, together with the weight of the bar 15, is such that the force exerted thereby will be sufficient to swing the gate.

21 is a second pitman pivotally connected with the lever 8 at 24, and with an arm 22 upon the operating member 11 at 23, and by means of which the said operating member may be drawn upward and swung upon its axis. It will be seen that when the gate is in its closed position as shown, the fulcrum 9 of the lever 8, the pivotal connection 24 between said lever and the second pitman 21, and the pivotal connection 23 between said second pitman and the operating member 11, are in line, by which it results that the said operating member cannot be lifted by a force applied directly thereto; the said pitman and lever forming a toggle by which the gate is locked in its closed position.

In swinging farm gates having operating means including a swinging member resembling somewhat the swinging member 11, there is ordinarily no means provided for preventing upward movement of the said member; so that it frequently happens in actual use that the said member is raised by an animal and the gate thereby opened. It will be seen, however, that in the operating means employed by me the liability of the gate to be operated as above pointed out is greatly reduced, if not entirely eliminated; for the operating member is locked in the position it occupies when the gate is closed by a toggle formed by the pitman 21 and lever 8, and said member can be swung upon its axis and the gate operated only when the toggle is broken and upward movement imparted to the pitman 21 by the lever 8.

Briefly stated, the operation of my gate is as follows: A rider upon approaching the gate pulls upon the flexible member 4, thereby swinging the lever 8 upon its fulcrum 9 and drawing the pitman 21 upward. The upward movement of the said pitman imparts a swinging movement to the operating member 11, which swings the gate through the pitman 18. The pull upon the flexible member 4 should be continued until the swinging member 11 is in substantially a vertical position, by which time the moving parts will have acquired sufficient momentum to carry said member past the central point of its movement, whereupon the weight of the operating member 11 will become effective to continue the movement of the gate into its open position.

Having thus described my invention and explained the operation thereof, I claim and desire to secure by Letters Patent:—

1. The combination with a gate adapted to swing about a vertical axis, of an operating member adapted to swing upon a horizontal axis; a pitman connecting said operating member and said gate and through which said gate may be operated; a second pitman one end of which is connected to said operating member and through which said member may be swung upon its axis to swing the gate into an open or closed position; a lever to which the other end of said second pitman is connected; a support for said lever; and means for operating said lever to thereby reciprocate said second pitman; the relative arrangement of the parts being such that the fulcrum of the lever, the point of connection of the second pitman therewith, and the point of connection of the second pitman with the operating member are in line when the gate is closed.

2. The combination with a gate adapted to swing about a vertical axis, of an operating member adapted to swing upon a horizontal axis; a pitman connecting said operating member and said gate and through which said gate may be operated; a second pitman one end of which is connected to said operating member and through which said member may be swung upon its axis to swing the gate into an open or closed position; a lever to which the other end of said second pitman is connected, and which lever serves also as a locking means for locking the gate in its closed position; a support for said lever; and means for operating said lever to thereby reciprocate said second pitman.

3. In a device of the class described, a vertical post; a gate hinged to said post; an operating member for swinging said gate, said member being adapted to swing upon a horizontal axis; a pitman connecting said operating member and said gate; a lever carried by said post; and a second pitman connecting said operating member and said lever and through which said operating member may be swung upon its axis to open or close the gate, said second pitman and said lever forming a toggle by which the gate may be locked in its closed position.

4. In a device of the class described, a vertical post; a gate hinged to said post; an operating member for swinging said gate, said member being adapted to swing upon a horizontal axis; a pitman connecting said operating member and said gate; a second pitman, one end whereof is connected to said operating member and through which said member may be swung upon its axis; a lever carried by said post and to which the other end of said second pitman is connected; a flexible connection for operating said lever; and a pulley carried by said post and through which said flexible connection passes.

5. In a device of the class described, a vertical post; a gate hinged to said post; an operating member for swinging said gate, said member being adapted to swing upon a horizontal axis; a pitman connecting said operating member and said gate; a second pitman, one end whereof is connected to said operating member and through which said member may be swung upon its axis; a lever carried by said post and to which the other end of said second pitman is connected, said lever and second pitman forming a toggle by means of which the gate may be locked in its closed position; a flexible connection for operating said lever; and a pulley carried by said post and through which said flexible connection passes.

6. In a device of the class described, a vertical post; a gate hinged to said post; an operating member for swinging said gate, said member being adapted to swing upon a horizontal axis; a pitman connecting said operating member and said gate; a second pitman, one end whereof is connected to said operating member and through which said member may be swung upon its axis; a lever carried by said post and to which the other end of said second pitman is connected, the relative arrangement of the parts being such that the fulcrum of the lever and both ends of said second pitman are in line when the gate is closed, whereby the gate will be locked in its closed position; a flexible connection for operating said lever; and a pulley carried by said post and through which said flexible connection passes.

This specification signed and witnessed this eighteenth day of October, A. D. 1907.

JAMES E. MANFORD.

Witnesses:
BEN MARSHALL,
G. A. THOMAS.